Patented Jan. 4, 1949

2,457,804

UNITED STATES PATENT OFFICE 2,457,804

SYNTHETIC BLOOD SUTURE AND METHOD

John O. Bower, Wyncote, Pa.

No Drawing. Application July 29, 1944,
Serial No. 547,317

20 Claims. (Cl. 128—335.5)

The synthetic suture of my invention is one manufactured from blood, and particularly from human blood; it is manufactured outstandingly from that now wasted residue from blood plasma extraction. Enormous waste occurs in connection with blood plasma extraction because the plasma content of the blood is but 54% whereas residue is 46%.

My invention is of a new product as well as of a new method of producing the product. The product is new because, so far as I am informed, I am the first to successfully spin synthetic sutures of substances derived in large part directly from human blood and the first to successfully use them. The method is new because never before, so far as I am aware, have successfully used sutures been produced directly from human blood. My invention has been described and claimed in my copending application, Serial No. 502,503, "Surgical suture and method," filed September 15, 1943, and so far as this application partakes of the purview of that application, this application is a continuation-in-part of that one.

Inasmuch as the new product of my invention can be more adequately apprehended and appreciated after the method of producing it is fully understood, I shall first describe the method.

According to this method, I first make a colloidal solution of the residue from blood plasma extraction from human blood. This residue is comprised outstandingly of the hemoglobin-electrolyte-stroma content of the blood, the plasma in the usual extraction process employed in blood banks being substantially completely extracted, though there may be very small percentages left. There are several methods known to me of making this hemoglobin-electrolyte-stroma solution but I prefer a method which I have devised by reason of the certainty with which the sterility of the solution can be preserved. This consists in extremely severe and accelerated freezing of the residue remaining after the centrifugal extraction of plasma, while it is yet contained in the sterile blood donor bottle. Such freezing I achieve by immersing in a solution of Sunoco spirits and Dry Ice at a temperature of approximately from −75 to −90 degrees centigrade and freezing as rapidly as possible consistent with the volume being frozen. Sunoco spirits is a commercial petroleum product, similar to highly-refined kerosene. This sudden freezing completely disrupts the blood cell walls (stroma) and reduces them to colloidal or at least submicroscopic form which will readily enter into solution with the liquid content of the cells. Upon melting of the frozen mass, the hemoglobin-electrolyte-stroma solution results. (See my copending application, Serial No. 519,686, filed January 25, 1944.)

From this hemoglobin-electrolyte-stroma solution I prepare a spinning solution in the following manner. To 70 grams of the hemoglobin-electrolyte-stroma solution I gradually add 91 grams of a 20% solution of sodium sulphide, constantly stirring the mixture with a glass rod. Conveniently the first addition is from 30 to 35 grams and subsequently additions in amounts of from 15 to 20 grams. After the first addition, a uniform jelly is produced after 3 or 4 minutes of stirring or equivalent agitation, and the consistency of the jelly is progressively changed as the further additions are made with proper agitations. To this solution 11.6 grams of the standard Le Page's liquid glue (or equivalent animal glue) is gradually added and thoroughly incorporated. The bases of this and other animal glues are collagens, proteins in collagenous form. This constitutes the spinning solution ready for filament spinning.

The spinning bath is a solution of sodium hydroxide, a 17.6% solution. A sizable glass syringe equipped with a 22 gauge hypodermic needle is filled with the spinning solution prepared as above, and the hypodermic needle being projected below the surface of the spinning bath (the latter contained in pyrex containers 20 inches long, 4 inches wide, 2 inches deep) spinning is achieved by exerting a uniform extruding pressure upon the syringe and slowly moving the point of the needle back and forth the length of the spinning bath, the while holding it beneath the surface. The extruded spinning solution in the spinning bath becomes a filament. Any number of lengths of the filaments may thus be spun merely by moving the syringe back and forth to form one loop after another. In such manner, I have formed continuous lengths of filaments between 300 and 400 inches and comprising 10 or a dozen loops.

The filaments so formed are caught up by their loops and raised out of the spinning bath of sodium hydroxide in yarn or thread form. So caught up, they consist of 10 or a dozen double filaments, that is to say, 20 or more strands, which are ultimately to form a single suture. So withdrawn, they immediately commence to consolidate. After permitting them to remain in air a minute or two, long enough to drip off excess sodium hydroxide, I immerse them in a setting bath for approximately 30 minutes and while so immersed stretch them to an elongation of approximately 25%, maintaining the stretch for the whole period of the immersion. Consolidation is furthered by the stretching en masse. This setting solution is comprised of 80 grams sulphuric acid, 50 grams formaldehyde, 200 grams dextrose and 670 grams distilled water.

Lifting the thread from this setting solution, I transfer it to a combined stretching and strengthening solution comprised of 400 grams formaldehyde, 320 grams glycerine, 80 grams of the same Le Page's animal glue and 800 grams distilled water. Immersing the thread in this solution, I stretch it to an additional elongation of from 10 to 25% of the original spun length, maintaining it immersed in the stretched condition for periods varying from 10 to 30 minutes, depending upon the degree of elasticity desired. Further consolidation takes place with general unifying of the diameter.

This operation complete, the thread is removed and permitted to dry for periods varying from 48 to 72 hours, the while maintaining it in elongated condition, that is to say, in the full length obtained in the two stages of stretching, the first to an elongation of from substantially 25%, and the second to an additional 10 to 25%.

Following this air curing, the suture constituted of these 20 or 25 filaments is placed in a final strengthening solution of 2% formaldehyde for a period of 72 hours, this while also maintaining its full elongation by suitable means. At the end of 24 hours, the filaments of the threads have become fully consolidated and of uniform diameter and strength, and their strength is amply sufficient for the suturing of wounds in both animal and man, as I have proven by actual use. The strength, of course, depends upon the size of the thread and the thread upon the number and size of the filaments, but as produced by the method I have just now described, the strength of the suture of a given diameter is quite comparable with the strength of a catgut suture of corresponding diameter in common use today. The strength may be also lessened or increased by varying the degree of stretching in the setting and strengthening solutions, respectively, as well as by varying the formaldehyde and glue content of these solutions. The strengths also may be increased by variation in the initial glue content of the primary spinning solution of sodium sulphide and blood content. The elasticity may be varied by varying the length of time the thread is permitted to remain in the stretching and strengthening solutions, particularly the formaldehyde solutions. The thread can be made softer when desired by immersing it in sterile olive or castor oil from 24 to 72 hours.

After the sutures are completed, they are sterilized by dry heat under the fractional method and then tubed in cumene or xylene according to the usual practice.

As indicated, now that the method of my invention is fully outlined, the product can be known with fullness. It is a surgical suture the strength elements of which are made from extracted animal blood, largely from extracted blood cell wall tissue. It is comprised of continuous filaments consolidated into a sizable yarn or thread, a substantially solid suture structure of substantially uniform diameter and of the full strength necessary to bind wounds. Its principal substance is the hemoglobin-electrolyte-stroma substance of human blood and of the same proportions as in human blood. Sodium sulphide is the dispersing agent of the hemoglobin-electrolyte-stroma content. The glue content is a powerful strengthening agency. The formaldehyde and the stretching are also powerful strengthening agencies. The protein content of the glue added to the protein content of the blood cells, the hemoglobin, and subjected to the stretchings, is acted upon by the formaldehyde in the stretched condition to improve the strength.

Sutures of this character so manufactured I have subjected not only to strength tests (which show the strength ample) but also to actual absorption tests. These absorption tests comprised embedding a number of such sutures in the longitudinal and circular muscle coats of the stomachs of test animals. While the suture as embedded occupies the entire opening made by the needle and the following suture, in but 11 days it is found that substantially all of the suture has been absorbed, there being but one or two relatively small islets of unabsorbed suture remaining. Connective tissue has ingrown substantially throughout the original area of the cross-section and permeated the spaces between the small remaining islets. The islets remaining after the 11 days are blood red in form. Such tests show that the fibroblastic proliferation is both early and extensive. Spaces between the islets and the connective tissue are absent, giving proof that the body cells of the animal do not react to the suture of my invention as they do to a foreign body. This is further corroborated by the absence of poly-morphonuclear infiltration. A substantially perfect freedom from irritation is the result.

The foregoing is all observable under low-power magnification. Under high-power magnification the cells which are in most intimate relationship with the few remaining islets of the original suture cross-section, appear mostly to be those which are the precursors of fibroblasts. Even the cells which are attached to the periphery of the remaining islets where the periphery is not in close relationship with the surrounding tissue show elongated nuclei suggesting the fibroblast in the early stage of its development.

These results show the new suture to be highly superior to the ordinary catgut suture. Such an ordinary suture after substantially the same length of time of embedding, 10 or 12 days, shows little or no absorption. Magnification shows wide-open spaces surrounding the relatively unabsorbed suture cross-section, indicating that the body cells react to the catgut as a foreign substance and do not receive it well. There is much evidence of poly-morphonuclear infiltration.

Now it must be evident that other constituents having the same characteristics as the foregoing may be used without departing from my invention. In other words, what I have discovered firstly is that the hemoglobin-electrolyte-stroma solution is susceptible to conversion in the spinning solution formed by reagents which act upon it in the same characteristic manner as sodium sulphide acts upon it. What I have discovered secondly is that the introduction of glue-like substances (especially those having a collagen base) markedly insures the strengths. I apprehend that there are other such substances even as there are other reagents for dissolving the hemoglobin-electrolye-stroma solution. Added substances which exhibit the same general reaction and results as the glue when added to the spinning solution fall within the spirit of my invention. Sodium caseinate sometimes referred to as "casein glue," is illustrative. Setting baths and strengthening baths also vary in kind and in proportions even as spinning baths vary in kind and in proportion. The nature of the setting bath is dependent in large measure upon the nature of the spinning bath as well as the nature of the spinning solution. Yet a third outstanding feature of my invention is my incorporation of strengthening agencies, by the use of formaldehyde in the setting bath, thus commencing chemical strengthening at the same time that I commence the stretch strengthening, and by the use of both formaldehyde and glue in the strengthening bath. This incorporation is by stages. It makes for uniformity and elasticity at the same time that it makes for strength. There are equivalents of this formaldehyde strengthening agency. Hydroquinone, which is often substituted for formaldehyde in the treatment of gelatin films, etc., may be employed in the present process.

Notably, other constituencies derived from blood itself may be used without departing from my invention. Thus I may use part only of the hemoglobin-electrolyte-stroma content of the blood or I may combine them together in proportions other than the proportions in which they exist in blood. So also I may use the hemoglobin content alone omitting the electrolyte and stroma content; may use the hemoglobin combined with the electrolyte; the stroma alone, or the stroma combined with the electrolyte. Any of these may be combined with various quantities of the blood plasma. Outstandingly, the full and complete blood itself may be similarly used, none of its content, not even any part of the plasma, having been previously extracted. The process in all cases will be substantially the same, the quantities of animal glue being raised if the protein content of the blood is lowered, and the water content of appropriate solutions being lowered when the full plasma content of the blood is used by reason of the water addition brought by the plasma. The strength and the proportions of the formaldehyde solutions will also be altered in accordance with the proportions of the protein content.

While my achievements have been made with human blood, I may use dog blood or other animal blood.

These multi-filament sutures may also be twisted to various degrees (a varying number of turns per inch of length) in order to improve their consolidation, their strength, and their elasticity. This twisting will be achieved just after the initial consolidation and stretching, preferably just after uniform consolidation but before the full initial 25% stretch, say after the first 10% stretch. The consolidation due to the glutinous character of the filaments, even when there is no twist, is most excellent but the individual filaments can be differentiated from each other after the suture is completed or during the process of its absorption in wounds under high-power magnification of sections.

The process of my invention can be used to manufacture sutures of such large denier as to be constituted by a single strand as distinguished from multiple strands. In this case, the spinning, setting, strengthening and curing times are increased and the strengths of the solutions may be somewhat more concentrated.

So, too, the process of my invention may be utilized in combination with catgut or other animal fiber filaments. Strands of catgut of great fineness may have the present solution applied to their exteriors either by extruding it thereover as the catgut itself is passed through the extrusion opening, or by dipping or otherwise. The spinning solution of my invention is set as extruded or immediately upon dipping into the setting solution (the sodium hydroxide solution). As such strands they may be consolidated together or consolidated and twisted in accordance with my invention to form a single suture. Similarly standard catgut sutures of single strands may have the substance of my full synthetic suture applied thereover as a coating, the initial application of the spinning solution either by extrusion or dipping being followed by appropriate setting and strengthening. The setting and strengthening solutions (and other solutions) I have set forth may be used in such cases, the stretching step being modified and stretch being but that which the catgut will appropriately stand under such substantial tension as to maintain it taut during the setting and strengthening processing.

Foreseeing such possibilities of modification forewarns that my present knowledge of the generic spirit of my invention is perhaps not as full as it should be. Therefore, as the fullness of the generic spirit shall become known through extended and enlarged use of my invention, I would invoke such interpretations of the terminology I use to define my invention in the annexed claims as shall comprehend it.

What I claim is:

1. The method of synthetically manufacturing sutures of blood which consists in using very approximately the equivalents of the following procedures, materials, proportions and interrelations of materials and proportions: to 70 grams of a solution containing the hemoglobin-electrolyte-stroma content of blood in substantially the same proportions as contained in blood first add gradually 91 grams of a 20% solution of sodium sulphide and then 11.6 grams of animal glue; then extrude as filaments in a 17.6% solution of sodium hydroxide; set the filaments so formed by immersing them in a setting solution comprised of 80 grams of sulphuric acid, 50 grams of formaldehyde, 200 grams of dextrose and 670 grams of distilled water, the while subjecting the filaments to a stretch of approximately 25%; follow by stretching an additional 25% in a stretching and strengthening solution comprised of 400 grams formaldehyde, 320 grams of glycerine, 80 grams animal glue and 800 grams of distilled water; then dry for from 48 to 72 hours while maintaining the stretched length; subject to further strengthening and hardening in a solution of formaldehyde of 2% for 72 hours; and finally dry and store in cumene or xylene.

2. A surgical suture the substance of which is obtained from blood and which comprises all the elements contained in the blood and in the same relative proportions as there contained saving only the water content.

3. An extruded surgical suture, the structural basis of which comprises, as a major component, the non-volatile residue of the corpuscular portion of blood.

4. An extruded surgical suture having blood-cell wall tissue as a major component of its structural basis.

5. An extrusion-spun, synthetic surgical suture of continuous filamentary character, at least one structural component of which is made from the corpuscular portion of animal blood.

6. An extrusion-spun surgical suture the strength elements of which are made primarily from a hemoglobin-electrolyte-stroma solution extracted from blood.

7. A synthetically precipitated and set surgical suture, extrusion-spun from a homogeneous solution of blood.

8. An extrusion-spun, synthetic surgical suture the major components of which are constituent substances of the corpuscular portion of blood, and sodium sulphide.

9. An extrusion-spun, synthetic surgical suture the major components of which are constituent substances of the corpuscular portion of blood and glue.

10. An extrusion-spun, synthetic surgical suture the major components of which are constituent substances of the corpuscular portion of blood, sodium sulphide, and glue.

11. In the art of extrusion-spinning of protein materials by precipitating an orifice-extruded proteinous spinning solution in an alkaline bath, removing alkali in an acid bath and removing acid in a rinsing bath, the process of producing surgical sutures containing hemoglobin, which process includes the steps af adding, to a solution consisting essentially of blood corpuscles in a state of dissolution in blood liquid, glue and sodium sulphide; orifice-extruding the solution into an alkaline precipitating bath in filamentary form; and acidulating, rinsing, and drying the filamentary material; whereby to form a consolidated, continuous surgical suture; the amount of glue added being sufficient to materially enhance the tensile strength of the ultimate filaments and the amount of sodium sulphide added being sufficient to render the solution orifice-extrudible.

12. The method of claim 11, in which the precipitated filaments are subjected to the action of formaldehyde.

13. The method of claim 12, in which the precipitated filaments are subjected to a solution containing dextrose.

14. The method of claim 11, in which the precipitated filaments are caused to pass through a bath containing glue.

15. The method of claim 11, in which formaldehyde, glycerine, and glue are added to the rinsing bath.

16. The method of claim 11, in which the precipitated filaments are stretched while wet.

17. The method of claim 12, in which the completed suture is softened with a non-volatile oil.

18. An extrusion-spun, synthetic surgical suture comprising a plurality of filaments, in each of which hemoglobin constitutes one of the major components.

19. The surgical suture of claim 18, in which the filaments are intertwined into a single strand, characterized by substantially complete freedom from deep grooves.

20. An extrustion-spun, synthetic surgical suture having as a major element of its structure hemoglobin admixed with stroma.

JOHN O. BOWER.

REFERENCES CITED

The following references are of record in the file of this patent:

UNITED STATES PATENTS

| Number | Name | Date |
|---|---|---|
| 1,168,173 | Davis | Jan. 11, 1916 |
| 1,504,225 | Fitzgerald | Aug. 12, 1924 |
| 1,999,641 | Sharp | Apr. 30, 1935 |
| 2,280,603 | Plambeck | Apr. 21, 1942 |

FOREIGN PATENTS

| Number | Country | Date |
|---|---|---|
| 26,155 | Great Britain, 1908 | Oct. 7, 1909 |
| 165,832 | Great Britain | July 11, 1921 |
| 393,505 | Great Britain | June 8, 1933 |
| 422,990 | Great Britain | Jan. 23, 1935 |
| 455,899 | Germany | Feb. 11, 1928 |

Certificate of Correction

Patent No. 2,457,804.　　　　　　　　　　　　　　　　　　　January 4, 1949.

JOHN O. BOWER

It is hereby certified that errors appear in the printed specification of the above numbered patent requiring correction as follows:

Column 4, line 73, for "electrolye" read *electrolyte*; column 8, line 21, claim 20, for "extrustion" read *extrusion*; line 36, list of references cited, insert the following:

2,202,566　　Schulte_____May 28, 1940 and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*